United States Patent [19]
Yamasaki et al.

[11] Patent Number: 5,435,713
[45] Date of Patent: Jul. 25, 1995

[54] UNDERWATER PELLETIZING APPARATUS

[75] Inventors: Nobuhiro Yamasaki; Shinichi Fukumizu; Masashi Konno; Osamu Ikeda; Kazuyoshi Imuta; Taiji Orimo; Hiroshi Ogasawara, all of Takasago, Japan

[73] Assignee: Kabushiki Kaisha Kobe Seiko Sho, Kobe, Japan

[21] Appl. No.: 162,977

[22] Filed: Dec. 8, 1993

Related U.S. Application Data

[63] Continuation of Ser. No. 981,307, Nov. 25, 1992, abandoned.

[30] Foreign Application Priority Data

Nov. 29, 1991 [JP] Japan ................... 3-316831

[51] Int. Cl.6 .......... A01J 21/02; B28B 7/14; B29C 59/00
[52] U.S. Cl. .......... 425/311; 425/DIG. 230
[58] Field of Search ..... 425/310, 311, 331, DIG. 230, 425/142, 175; 241/70, 44, 101.7, 82.5; 299/8, 9

[56] References Cited

U.S. PATENT DOCUMENTS

| | | | |
|---|---|---|---|
| 2,218,751 | 10/1940 | Humphrey | 425/310 X |
| 3,536,115 | 10/1970 | Weiler | 241/82.5 |
| 3,542,104 | 11/1970 | Anderson | 241/82.5 |
| 4,108,387 | 8/1978 | Weiler | 241/82.5 |
| 4,123,207 | 10/1978 | Dudley | 425/67 |
| 4,422,372 | 12/1983 | Hoezee | 241/82.5 X |
| 4,500,271 | 2/1985 | Smith | 425/311 X |
| 4,529,370 | 7/1985 | Holmes . | |
| 4,770,621 | 9/1988 | Groebu et al. | 425/331 X |
| 4,775,108 | 10/1988 | Schnell | 241/82.5 X |
| 4,844,372 | 7/1989 | Weiler et al. | 241/82.5 X |
| 5,009,586 | 4/1991 | Pallmann | 425/331 X |
| 5,059,103 | 10/1991 | Bruckmann et al. | 425/142 X |
| 5,143,673 | 9/1992 | Grimminger | 425/DIG. 230 X |
| 5,292,240 | 3/1994 | Capelle | 425/142 |

FOREIGN PATENT DOCUMENTS

| | | | |
|---|---|---|---|
| 238147 | 9/1987 | European Pat. Off. | 425/331 |
| 0418941A1 | 3/1991 | European Pat. Off. . | |
| 1231046 | 12/1966 | Germany | 425/331 |
| 4431082 | 12/1969 | Japan | 425/331 |
| 484178 | 2/1973 | Japan | 425/310 |

*Primary Examiner*—Frances Han
*Attorney, Agent, or Firm*—Oblon, Spivak, McClelland, Maier, & Neustadt

[57] ABSTRACT

An underwater pelletizing apparatus for realizing and stabilizing a pressure to press a cutting knife against a die plate, for preventing shaft vibration, and for decreasing wear of the cutting knife.

The die plate and a water chamber casing are removably mounted at a thermoplastic material extrusion opening section; the cutting knife is disposed at the front of the die plate; a cutter shaft with the knife mounted at the forward end thereof is rotatably and axially movably supported in the water chamber casing and a shaft supporting housing to thereby move the cutter shaft forward and backward by means of a fluid pressure cylinder; and a locking means is provided for intermittently locking the axial movement of the cutter shaft.

3 Claims, 3 Drawing Sheets

UNDERWATER PELLETIZING APPARATUS

This application is a Continuation of application Ser. No. 07/981,307, filed on Nov. 25, 1992, now abandoned.

BACKGROUND OF THE INVENTION

1. Field of the Invention

The present invention relates to an underwater pelletizing apparatus for cutting a hot melt thermoplastic material being extruded out from an extruding machine, a geared pump, and so forth, into water, in a form of pellets by a cutting knife.

2. Description of the Related Art

As this type of pelletizer, the apparatus shown in FIG. 4 is generally known. This apparatus is exchangeably installed on the front end of an extrusion opening section 42 of an extruding machine 41 having a screw shaft 40, etc. for mixing and extruding a thermoplastic material such as a synthetic resin, etc.

In this apparatus a die plate 43 and a water chamber casing 44 are removably mounted on the forward end of the extrusion opening section 42; a cutting knife 45 is disposed at the front of the die plate 43; a cutting knife shaft 46 with the cutting knife 45 mounted on the forward end is rotatably and axially movably supported in a water chamber casing 44 and a shaft supporting housing 47, so that the cutter shaft 46 is moved backward and forward by means of a spring-loaded hydraulic cylinder 48.

An underwater pelletizing apparatus previously adopted is of a press-to-cut system that, when a thermoplastic material is cut under water, the cutting knife 45 is rotated, being pressed with a specific pressure against the die plate 43, to cut the thermoplastic material to a specific size. In this apparatus a pressure oil is suppled into the hydraulic cylinder 48 through a regulator 49, to thereby turn the cutting knife 45 with the cutting knife 45 held pressed against the die plate 43 with a specific pressure.

The pressure for pressing the cutting knife 45 against the die plate 43 is an operating oil pressure to be supplied to the hydraulic cylinder 48 after regulation by means of the regulator 49, rotating the cutting knife 45 in the state that the amount of pressure is kept constant as shown in FIG. 5.

In the above-described example of a prior-art technique, the cutting knife 45 is operated while being constantly pressed against the die plate 43; therefore it is required to press the cutting knife 45 with the least possible pressure for the purpose of decreasing wear of the knife; furthermore, in the event of little pressure, the cutting knife 45 will be pushed backward with the resin being extruded from the die plate 43, to thereby cause the cutter shaft 46 to vibrate, resulting in unstable cutting. It is, therefore, necessary to continuously press with a fixed pressure or a greater pressure indicated by Pmin in FIG. 5.

SUMMARY OF THE INVENTION

In view of the above-described actual circumstances, the present invention has as its object the provision of an underwater pelletizing apparatus which is capable of setting a little pressure for pressing the cutting knife against the die plate, and also of cutting a material without vibration of the cutting knife and accordingly with little wear of the cutter shaft.

The present invention is provided with the following technological means in an attempt to accomplish the object stated above.

That is, in the underwater pelletizing apparatus of present invention, in which a die plate and a water chamber casing are removably mounted at an opening at which a thermoplastic material is extruded out; a cutting knife is disposed at the front of the die plate; and a cutter shaft with this cutting knife mounted on the forward end are rotatably and axially movably supported in the water chamber casing and the shaft supporting housing and is continuously pressed by a fluid pressure cylinder to the die plate for the purpose of compensating for the wear of the knife, there is provided a locking means for intermittently locking the axial movement of the cutter shaft.

According to the present invention, the axial movement of the cutter shaft is intermittently locked by the locking means while the cutter shaft is rotating; the pressure to press the cutter shaft by the fluid pressure cylinder gradually decreases at and after the time of shaft locking, suddenly increases upon unlocking the shaft, and again gradually decreases upon locking the shaft, thus repeating the above-described operation.

Therefore, the cutting knife is worn little as compared with the prior-art cutting knife which is held continuously pressed with a fixed pressure against the die plate, and furthermore since the cutter shaft is locked in the state that the cutting knife is being pressed against the die plate, cutting the material is performed with stability and without axial vibration of the shaft in the event of a little pressure for pressing the cutting knife.

The above-described feature and other features, objects and advantages of the present invention will become more obvious from the accompanying drawings which show, for purpose of illustration, one preferred embodiment in accordance with the present invention.

DESCRIPTION OF THE PREFERRED EMBODIMENT

Hereinafter an embodiment of an underwater pelletizing apparatus according to the present invention will be explained with reference to the accompanying drawings.

Figure 1:
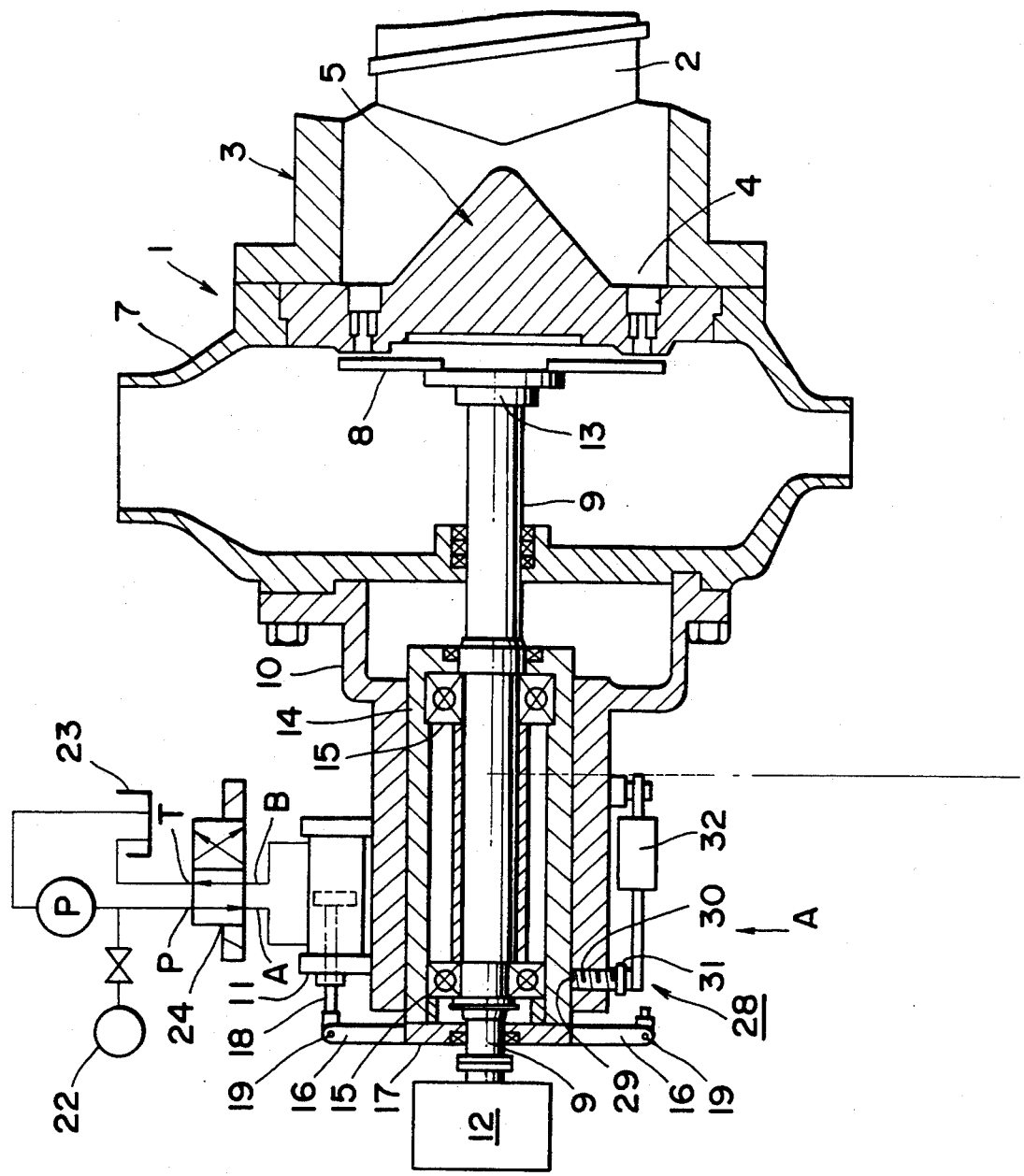
FIG. 1 is a side view in longitudinal section showing an embodiment of the present invention.
Figure 2:
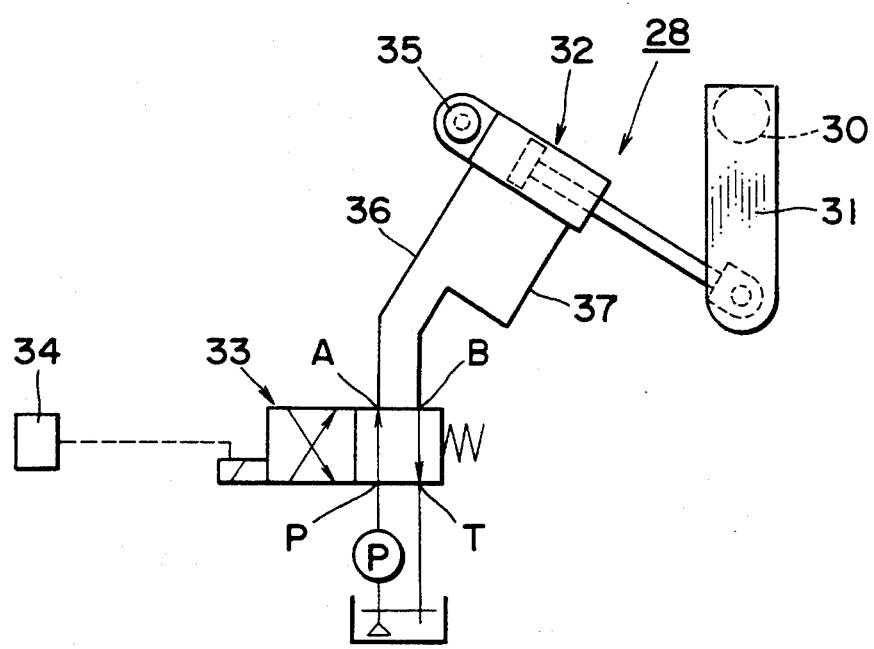
FIG. 2 is a view taken in the direction of the arrow A in FIG. 1.

FIGS. 1 and 2 show the embodiment of the present invention, in which an underwater pelletizing apparatus 1 is for manufacturing pellets of thermoplastic synthetic resin, and is removably mounted at the front end extrusion opening section 4 of an extruding machine 3 having a mixing-extruding screw shaft 2.

The pelletizing apparatus 1 is composed of a die plate 5 and a water chamber casing 7 which are both removably mounted at the aforesaid opening section 4, a cutting knife 8 rotating opposite the front face of the die plate 15, an axially movable cutter shaft 9 for elastically holding the cutting knife 8, a shaft-supporting housing 10 fixedly attached to the water chamber 7 and supporting the cutter shaft 9 watertight, a fluid pressure cylinder 11 for moving and pressing the cutter shaft, and a motor 12 for driving the shaft.

The cutting knife 8 is located within the water chamber casing 7 and is elastically and removably mounted on the inner-end of the cutting shaft through a knife holder 13.

Inside the housing 10 a bearing housing 14 is axially slidably fitted, and the cutter shaft 9 is rotatably supported on a bearing 15. On and under the outer end of the bearing housing 14 are projectingly provided arms 16. And a cover plate 17 in which the cutter shaft 9 is inserted through is fixedly attached to the bearing housing 14.

To the outer end of each of the arms 16 is connected the outer end of a piston rod 18 of the cylinder 11 through a pin 19, so that the cutter shaft 9 may be axially driven by means of the cylinder 11 through the arms 16, the cover plate 17, the bearing housing 14 and the bearing 15, thus moving to press the cutting knife 8 against the die plate 5.

During normal operation, the hydraulic fluid of a specific pressure is always supplied to the A port side of the fluid pressure cylinder 11 by switching the A and B ports of the solenoid valve 24. A numeral 22 refers to a pressure gauge, and a numeral 23, a fluid tank.

A numeral 28 denotes a locking means for locking the cutter shaft moving in the axial direction. This locking element such as a means 28 consists of a locking screw member 30 screwed in a threaded hole 29 provided through in the peripheral surface of the outer end section of the housing 10 and driving means. The driving means include a driving lever 31 fixedly attached on the outer end of the screw member 30 as shown in FIG. 2, a fluid pressure cylinder 32 for driving to push and pull the other end of the lever 31, a solenoid valve 33, and a timer 34.

The fluid pressure cylinder 32 is swingably installed to the housing 10 through a shaft 35, and the A port of the solenoid valve 33 is connected to the piston side oil chamber by a supply pipe 36 while the B port of the solenoid valve 33 is connected to the rod side oil chamber by a supply pipe 37, so that the A and B ports of the solenoid valve 33 will be switched by means of the timer 34.

Figure 3:
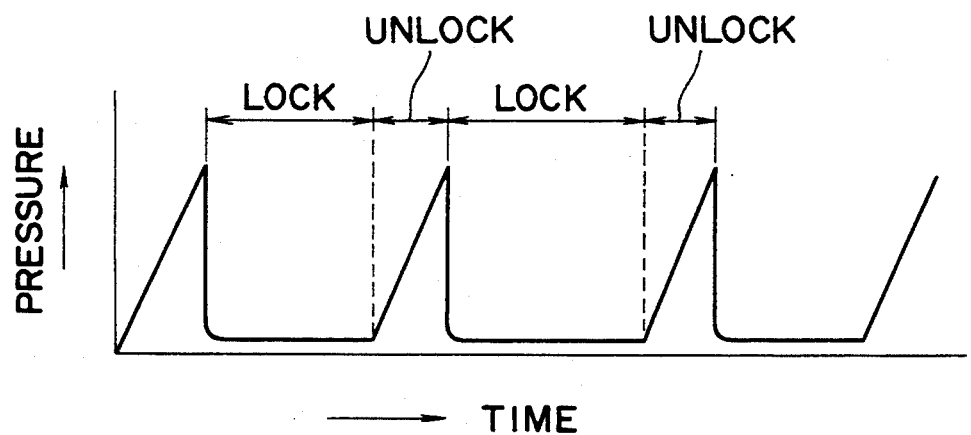
FIG. 3 is a graph showing changes in the pressure for pressing the cutting knife.
Figure 4:
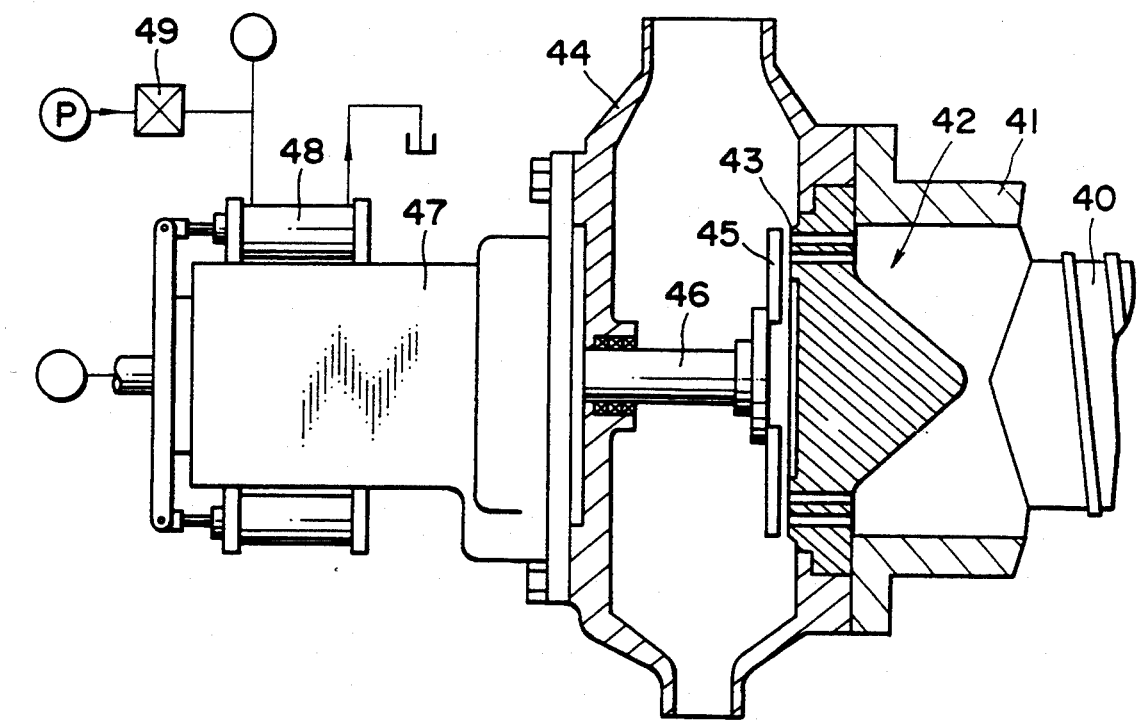
FIG. 4 is a side view, partly broken, showing a prior-art example.
Figure 5:
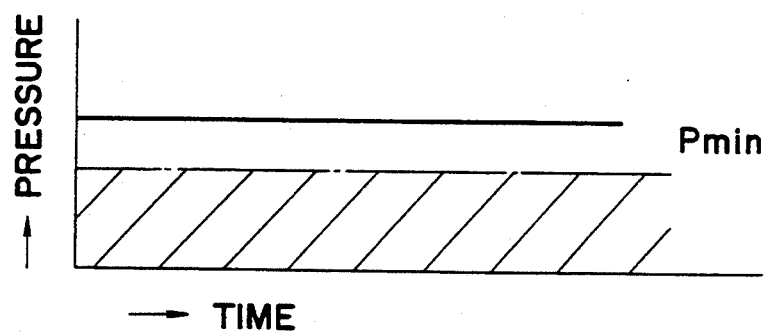
FIG. 5 is a graph explaining the pressure for pressing the cutting knife in a prior-art example.

The timer 34 is set to a specific time in accordance with the type and output of pellets of a thermoplastic material to be produced, so that the A and B ports of the solenoid valve 33 will be switched to intermittently repeat Lock→Unlock→Lock at a preset time interval as shown in FIG. 3.

In the above-described embodiment, the rotation of the cutter shaft 9 will not be restricted by the locking means 28; and with the cutting knife held pressed against the die plate 5, the locking means 28 turns in to tighten the screw member 30 to lock the bearing housing 14, or to loosen the screw member 30 to unlock the bearing housing 14, at the time interval preset by the timer 34.

Intermittently locking the cutter shaft 9 as stated above changes the pressure to press the cutting knife 8 against the die plate 5 as shown in FIG. 3, thus reducing the wear of the cutting knife 8 and the die plate 5; therefore, in the event of a reduced pressure, stabilized pellet cutting can be continuously performed without retreating the cutting knife 8 and without shaft vibration.

It should be noted that the present invention is not limited only to the above-described embodiment; for example, the piston rod 18 of the fluid pressure cylinder 11 for retreating the cutter shaft 9 may be so constituted as to be intermittently operated by means of a locking means using a brake mounted in the cylinder cover or other for locking and unlocking the cutter shaft.

In the underwater pelletizing apparatus of the present invention, as described above, a die plate and a water chamber casing are each removably mounted at a thermoplastic material extrusion opening section, a cutting knife is disposed at the front side of the die plate, and a cutter shaft mounted with the cutting knife on the forward end is rotatably and axially movably supported in a water chamber casing and a shaft supporting housing, so that the cutter shaft is always pressed against the die plate by means of a fluid pressure cylinder for the purpose of compensating for the amount of wear of the knife.

Since there is provided the locking means for intermittently locking the axial movement of the cutter shaft, the pressure to press the cutting knife can be decreased to realize stabilized cutting operation without accidental backward movement and vibration of the shaft, thereby enabling reducing wear of the cutting knife and the die plate and improving the quality of pellets.

What is claimed is:

1. An underwater pelletizing apparatus comprising:
   a die plate and a water chamber casing each mounted at a thermoplastic material extrusion opening section;
   a cutting knife disposed at the front of said die plate;
   a cutter shaft with said cutting knife mounted on the forward end thereof, said cutter shaft being rotatably and axially movably supported in said water chamber casing via a housing and said cutting knife being constantly pressed against said die plate by a fluid pressure cylinder, to thereby compensate for the amount of wear of said knife; and
   a locking means for regularly and intermittently locking the axial movement of said cutter shaft while said cutting knife is pressed against said die plate by said fluid pressure cylinder and for unlocking the axial movement of said cutter shaft while said cutting knife is pressed against said die plate with increased pressure from said fluid pressure cylinder so that blade wear is reduced with reduced vibrations.

2. The apparatus of claim 1 wherein said locking means comprises:
   a locking element; and
   drive means including a timer for intermittently pressing the locking element onto said shaft supporting housing.

3. The apparatus of claim 2 wherein said locking element is a screw and said drive means includes a solenoid valve controlled by said timer.

* * * * *